US012578607B2

(12) United States Patent
Clark et al.

(10) Patent No.: US 12,578,607 B2
(45) Date of Patent: Mar. 17, 2026

(54) DEVICE INCLUDING FERROELECTRIC NEMATIC LIQUID CRYSTAL-FORMING MOLECULES AND METHODS OF FORMING AND USING SAME

(71) Applicant: The Regents of the University of Colorado, a body corporate, Denver, CO (US)

(72) Inventors: Noel A. Clark, Boulder, CO (US); Xi Chen, Boulder, CO (US); Joseph E. Maclennan, Boulder, CO (US); Matthew A. Glaser, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 18/270,637

(22) PCT Filed: Dec. 30, 2021

(86) PCT No.: PCT/US2021/065662
§ 371 (c)(1),
(2) Date: Jun. 30, 2023

(87) PCT Pub. No.: WO2022/147232
PCT Pub. Date: Jul. 7, 2022

(65) Prior Publication Data
US 2024/0077778 A1 Mar. 7, 2024

Related U.S. Application Data

(60) Provisional application No. 63/132,194, filed on Dec. 30, 2020.

(51) Int. Cl.
*G02F 1/141* (2006.01)
*G02F 1/1337* (2006.01)

(52) U.S. Cl.
CPC ........ *G02F 1/141* (2013.01); *G02F 1/133788* (2013.01)

(58) Field of Classification Search
None
See application file for complete search history.

(56) References Cited

U.S. PATENT DOCUMENTS

| | | | |
|---|---|---|---|
| 5,437,816 A | 8/1995 | Endo et al. | |
| 5,702,636 A * | 12/1997 | Whang ................ | C09K 19/542 349/91 |

(Continued)

FOREIGN PATENT DOCUMENTS

| | | | | |
|---|---|---|---|---|
| GB | 2303464 A * | 2/1997 | .......... | G02F 1/1396 |
| JP | H0933957 A | 2/1997 | | |

OTHER PUBLICATIONS

PCT; Notification of Transmittal of the International Search Report and the Written Opinion of the International Searching Authority dated Mar. 17, 2022 for Application No. PCT/US2021/065662.

(Continued)

*Primary Examiner* — Ryan Crockett
(74) *Attorney, Agent, or Firm* — COZEN O'CONNOR

(57) ABSTRACT

Surface polarity of a ferroelectric nematic can be configured to generate vectorial control of the orientation of its bulk polarization field. The contact between a surface with in-plane polarity and a ferroelectric nematic liquid crystal generates preferred in-plane orientation of the ferroelectric polarization field at that interface, which can lead to the formation of fluid or glassy monodomains of high polarization without electric field poling. Materials surfaces can be used as a route to making planar-aligned cells with a variety of azimuthal director/polarization structures, including twisted states, in a π-twist cell, obtained with antiparallel, unidirectional buffing on opposing surfaces, we demonstrate three distinct modes of ferroelectric nematic electro-optic (Continued)

Figure 1:
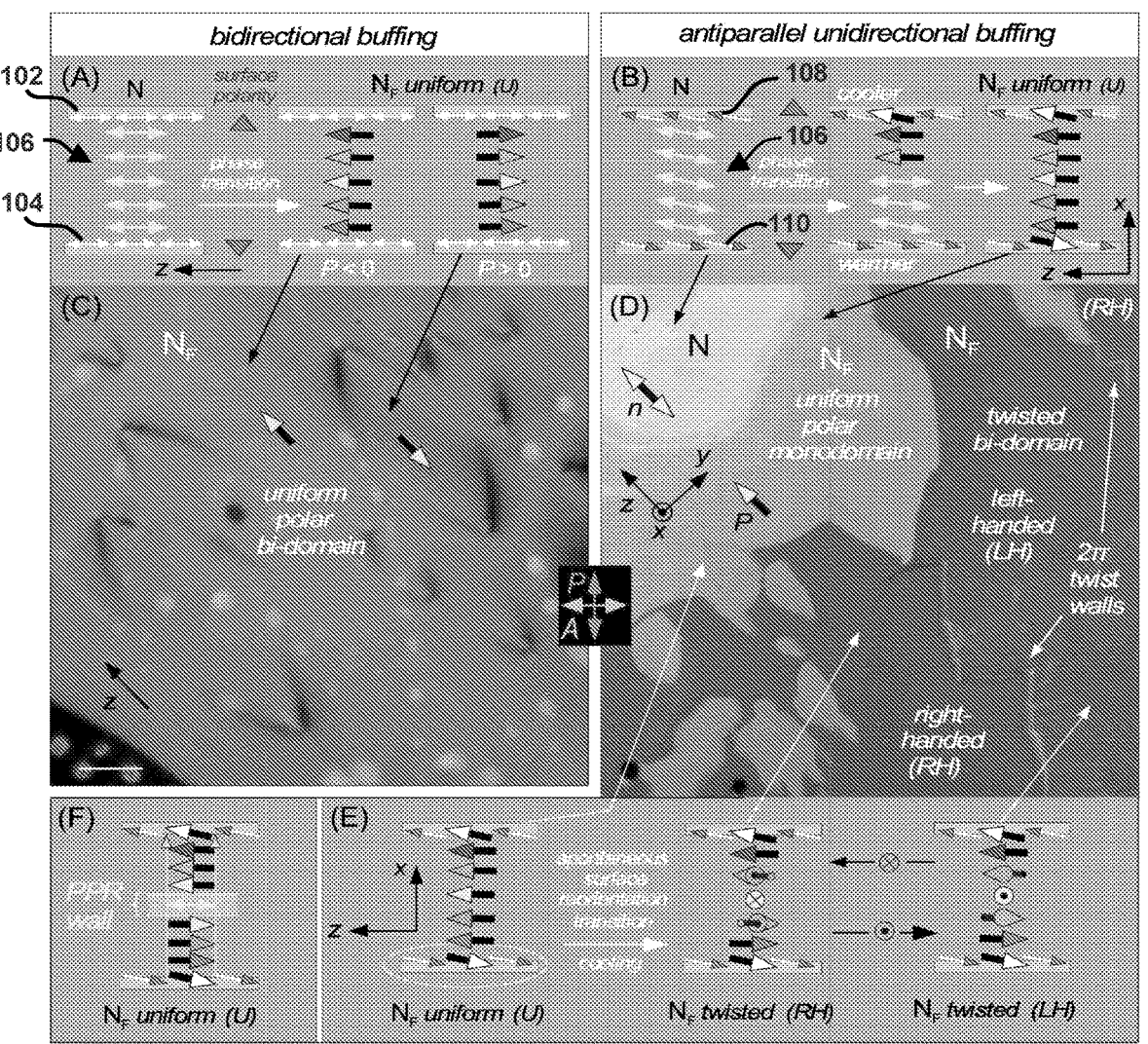

response: intrinsic viscosity-limited field induced molecular reorientation, field-induced motion of domain walls separating twisted states of opposite chirality; and propagation of polarization reorientation solitons from the cell plates to the cell center upon field reversal.

21 Claims, 5 Drawing Sheets

(56) References Cited

U.S. PATENT DOCUMENTS

| | | | | | |
|---|---|---|---|---|---|
| 5,801,800 | A | * | 9/1998 | Wright | G09G 3/007 |
| | | | | | 349/77 |
| 5,972,242 | A | * | 10/1999 | Takigawa | C09K 19/2021 |
| | | | | | 252/299.65 |
| 2005/0024568 | A1 | * | 2/2005 | Choi | G02F 1/141 |
| | | | | | 349/133 |
| 2005/0179843 | A1 | | 8/2005 | Kim et al. | |
| 2008/0266647 | A1 | * | 10/2008 | Vincent | C07C 245/08 |
| | | | | | 359/321 |
| 2011/0007023 | A1 | * | 1/2011 | Abrahamsson | G06F 3/0416 |
| | | | | | 345/174 |
| 2011/0199056 | A1 | * | 8/2011 | Pinto, IV | H01M 10/441 |
| | | | | | 320/152 |
| 2015/0085224 | A1 | * | 3/2015 | Hsu | H10K 59/8793 |
| | | | | | 349/98 |
| 2015/0185422 | A1 | * | 7/2015 | Chan | G02F 1/1326 |
| | | | | | 385/17 |
| 2015/0191650 | A1 | * | 7/2015 | Kim | C09K 19/02 |
| | | | | | 252/299.01 |
| 2016/0209720 | A1 | | 7/2016 | Kompanets | |
| 2023/0093063 | A1 | * | 3/2023 | Clark | G02F 1/0045 |
| | | | | | 349/33 |

OTHER PUBLICATIONS

PCT; Notification Concerning Transmittal of International Preliminary Report on Patentability dated Jul. 13, 2023 for Application No. PCT/US2021/065662.

PCT; International Preliminary Report on Patentability dated Jul. 4, 2023 for Application No. PCT/US2021/065662.

Chen, X et al. "First-principles experimental demonstration of ferroelectricity in a thermotropic nematic liquid crystal: Polar domains and striking electro-optics" PNAS Jun. 23, 2020; vol. 117 No. 25; pp. 14021-14031.

European Patent Application No. 21916483.7, Search report and opinion dated Nov. 4, 2024, 6 pages.

Korean Patent Application No. 10-2023-7026081 Office Action, with English translation, dated Jun. 19, 2025, 14 pages.

First Office Action for Japanese Patent Application No. 2023-540060, mailed Dec. 24, 2025, 21 pages.

Nishikawa et al., "A fluid liquid crystal with ferroelectric-like order," Proc. of SPIE, 2019, vol. 10941, 11 pages.

* cited by examiner

DEVICE INCLUDING FERROELECTRIC NEMATIC LIQUID CRYSTAL-FORMING MOLECULES AND METHODS OF FORMING AND USING SAME

CROSS-REFERENCE TO RELATED APPLICATION

This application is a U.S. national stage of International Application No. PCT/US2021/065662 entitled DEVICE INCLUDING FERROELECTRIC NEMATIC LIQUID CRYSTAL-FORMING MOLECULES AND METHODS OF FORMING AND USING SAME filed Dec. 30, 2021 which claims the benefit of provisional application Ser. No. 63/132,194, titled DEVICE INCLUDING FERROELEC-TRIC NEMATIC LIQUID CRYSTAL-FORMING MOL-ECULES AND METHODS OF FORMING AND USING SAME, filed Dec. 30, 2020, the contents of each of the foregoing applications are hereby incorporated herein by reference.

FEDERALLY SPONSORED RESEARCH

This invention was made with government support under grant numbers DMR1420736, DMR2005170, and DMR1710711 awarded by the National Science Foundation. The government has certain rights in the invention.

BACKGROUND

Nematic liquid crystals (LCs) are useful because of their facile collective response to applied fields and to surface forces. In a liquid crystal, the bulk response is the long-ranged deformation of a fluid, elastic field of molecular orientation, on which confining surfaces establish geometri-cal and topological structural constraints. In the realm of electro-optics, these two basic elements of LC phenomenol-ogy have been combined to create LC display technology, thereby enabling the portable computing revolution of the twentieth century. In this development and until very recently, nematic electro-optics has been based on bulk dielectric alignment, in which a quadrupolar coupling to applied electric field induces polarization in a nonpolar LC to generate torque and molecular reorientation. Surface interactions employed to achieve desirable device structures are similarly quadrupolar, with common treatments such as buffing or photo-alignment described by the Rapini-Popou-lar (RP) model and its variants.

Nematic liquid crystals are fluids having internal long-range orientational ordering. In statistical mechanical terms, because the isotropic-to-nematic phase transition breaks orientational symmetry, it yields Goldstone modes in the nematic, describing spatial variation of the director, n(r), the local average molecular orientation. Because of the full orientational symmetry of the isotropic phase, the nematic director has no globally preferred orientation and therefore the harmonic (elastic) energy cost of orientational variation of wavevector q decreases to zero as Kq2 at long wave-lengths, where K is the orientational (Frank) elastic constant. A bulk nematic sample in three dimensions can be oriented by providing an arbitrarily small force, e.g., an arbitrarily small applied electric or magnetic field, which couples to nematic orientation via quadrupolar anisotropy, respectively dielectric or diamagnetic. The nematic order is similarly infinitely responsive to boundary conditions, i.e., to surfaces on which there is orientational anisotropy. Because the nematic is a fluid, these conditions make it possible to put a nematic in a chosen container, have it spontaneously anneal into a chosen space-filling three dimensional (3D) director orientation structure, and have this structure respond in a predictable way to applied field. In practice, the surfaces and fields must be strong enough to eliminate defects and produce reorientations sufficiently fast to be useful.

A novel nematic liquid crystal phase has recently been shown to be a ferroelectric nematic (NF), offering a variety of opportunities to employ LC field and surface phenomena in exciting and powerful new ways. The NF LC is a 3D liquid having a macroscopic electric polarization P(r). On the nanoscale, each molecular dipole is constrained to be nearly parallel to its molecular steric long axis, which macroscopically translates into a strong orientational cou-pling making P(r) locally parallel to ±n(r), the local average molecular long axis orientation and uniaxial optic axis of the phase. The polarization thus endows the NF with coupling between n(r) and applied electric field, E, that is linear and is dominant over the dielectric coupling at low E. The NF phase exhibits self-stabilized spontaneous polar ordering that is nearly complete, with a polar order parameter, p=⟨ cos (βi)⟩ ≳0.9, where βi is the angle between a typical molecu-lar dipole and the local average polarization density P. The resulting large spontaneous polarization,P∼6 μC/cm², enables field-induced nematic director reorientation and an associated electro-optic (EO) response with fields applied in typical cells as small as ∼1V/cm, a thousand times smaller than those that comparably reorient dielectric nematics.

Any discussion, including discussion of problems and solutions, set forth in this section, has been included in this disclosure solely for the purpose of providing a context for the present disclosure, and should not be taken as an admission that any or all of the discussion was known at the time the invention was made or otherwise constitutes prior art.

SUMMARY OF THE DISCLOSURE

This summary is provided to introduce a selection of concepts. This summary is not intended to necessarily identify key features or essential features of the claimed subject matter, nor is it intended to be used to limit the scope of the claimed subject matter.

Various embodiments of the present disclosure relate to devices and to methods of using and forming the devices.

In accordance with exemplary embodiments of the dis-closure, a device includes a volume comprising ferroelectric nematic liquid crystal-forming molecules, said volume con-taining a ferroelectric nematic liquid crystal phase, said ferroelectric nematic liquid crystal phase comprising a vec-toral orientation field of the electric polarization density throughout the volume, and one or more materials compris-ing one or more surfaces in contact with the volume. The one or more surfaces can be configured to impart a favored surface polarity of the molecules, said favored surface polarity controlling said vectoral orientation at the interfaces with the one or more surfaces.

In accordance with further examples of the disclosure, a method for controlling a favored vectoral orientation in three dimensions of a polarization field of a ferroelectric liquid crystal at an interfacial surface with a material or materials is provided. The method can include providing a volume comprising ferroelectric liquid crystal-forming molecules, providing a first material having a first surface in contact with the volume, and using the first surface, imparting a favored surface polarity of the molecules, said favored surface polarity controlling said favored vectoral orientation of the molecules in said volume.

In accordance with yet additional exemplary embodiments of the disclosure, a method of forming a ferroelectric nematic liquid crystal device is provided. The method includes the steps of providing a volume comprising ferroelectric liquid crystal-forming molecules in a nematic state, providing a first material comprising a first surface in contact with the volume, and imparting a favored surface polarity of the molecules, said favored surface polarity controlling a vectoral orientation at an interfaces with the first surface.

In accordance with further additional examples of the disclosure, a device includes a volume comprising ferroelectric liquid crystal-forming molecules and a first material comprising a first surface in contact with the volume, wherein the first surface is configured to impart a favored surface polarity of the molecules to control a vectoral orientation of the molecules within the volume at an interface with the first surface.

Additional examples are set forth in the claims, including dependent claims. Unless otherwise noted, the dependent claims can be combined with independent claims or other dependent claims in any combination.

These and other embodiments will become readily apparent to those skilled in the art from the following detailed description of certain embodiments having reference to the figures; the disclosure not being limited to any particular embodiment(s) disclosed.

BRIEF DESCRIPTION OF THE DRAWING FIGURES

A more complete understanding of exemplary embodiments of the present disclosure can be derived by referring to the detailed description and claims when considered in connection with the following illustrative figures.

FIG. 1 illustrates cell structures of the NF phase of RM734 under different planar alignment conditions, imaged using depolarized light transmission microscopy (DTLM). (A,C) A cell with bidirectional surface buffing gives planar alignment and no pretilt (director parallel to the surface). This surface is nonpolar, allowing the formation of domains of opposite ferroelectric polarization (d=11 μm, T=120° C.). (B,D,E) An ANTIPOLAR cell with unidirectional surface buffing which gives planar alignment with pretilt of a few degrees (d=4.6 μm). Pretilt couples the NF polarization to the inherent surface-normal polarity (polymer on one side, LC on the other), giving in-plane polar anchoring of the bulk NF. Cooling through the N-NF transition with a temperature difference between the plates therefore grows a polar oriented monodomain from the cooler plate. (E) With buffing antiparallel on the two plates, as the cell is cooled into the NF phase the orientation near the warmer plate undergoes a surface reorientation transition to its lower energy polar state, creating π twist in the n-P field. This twist can be either left handed (LH) or right handed (RH), with 2π twist walls separating these two states. The LH and RH states are optically degenerate between crossed polarizer and analyzer. (F) Schematic diagram of a U state, and of the LH and RH πT states. The uniform director state has grown in in absence of a gradient in T, from each surface, making a PPR wall near the cell center. Scale bars: (A) 20 μm, (B) 200 μm.

Figure 2:
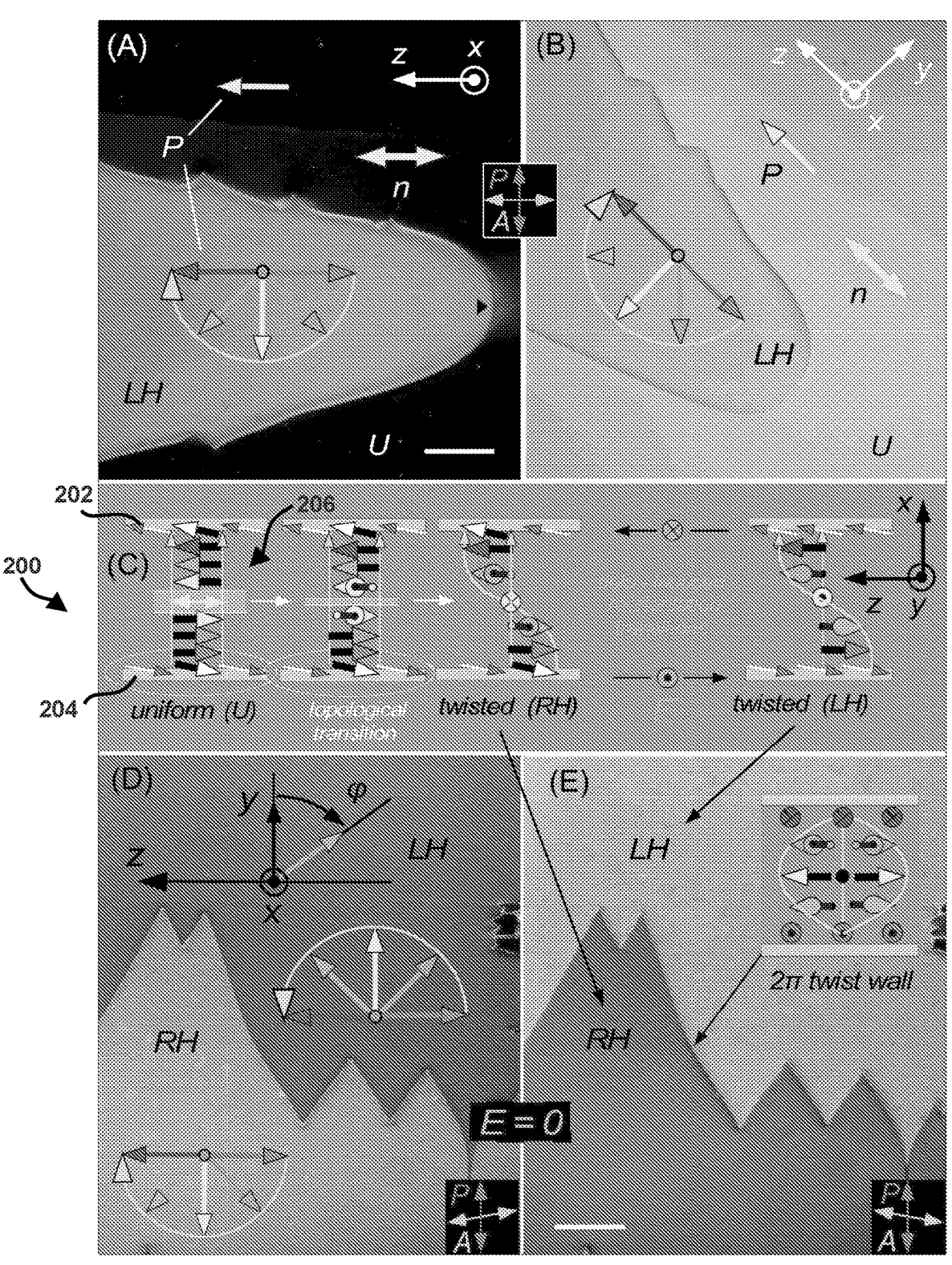

FIG. 2 illustrates orientational states of an ANTIPOLAR cell. Stable π twisted (πT) states in the NF phase, induced by surface polar anchoring generated using antiparallel unidirectional buffing, and imaged using DTLM, at T=125° C.

The red-to-blue arrow rainbow represents the ferroelectric polarization orientation at a sequence of increasing x-levels in the cell (x=0, d/4, d/2, 3d/4, d, where d=3.5 μm). The pink arrows indicate the azimuthal angular trajectory of φ(x) from the bottom to the top of the cell, which is also the light propagation direction. (A,B) A left-handed (LH) πT state (orange) growing into a uniform (U) state. The U state is dark between crossed polarizer and analyzer when n is parallel to or normal to the analyzer, but shows its birefringence when rotated (B). The color of the πT state does not depend strongly on cell orientation. (C) Schematic diagram of a U state, and of the LH and RH πT states. The uniform director state has grown in in absence of a gradient in T, from each surface, making a PPR wall near the cell center. The twist deformation at the PPR wall indicated for the yellow vectors initially costs local twist Frank energy but eventually will lower the energy, effecting a topological transition that converts the PPR wall into uniform director twist between the cell plates. (D,E) Uncrossing the analyzer lifts the optical degeneracy of the of the LH and RH states, revealing their chirality and optical symmetry under simultaneous mirror reflection (LH to RH) and reversal of the decrossing angle. (E) The LH and RH states are separated by a 2π twist wall. Scale bars: 200 μm.

Figure 3:
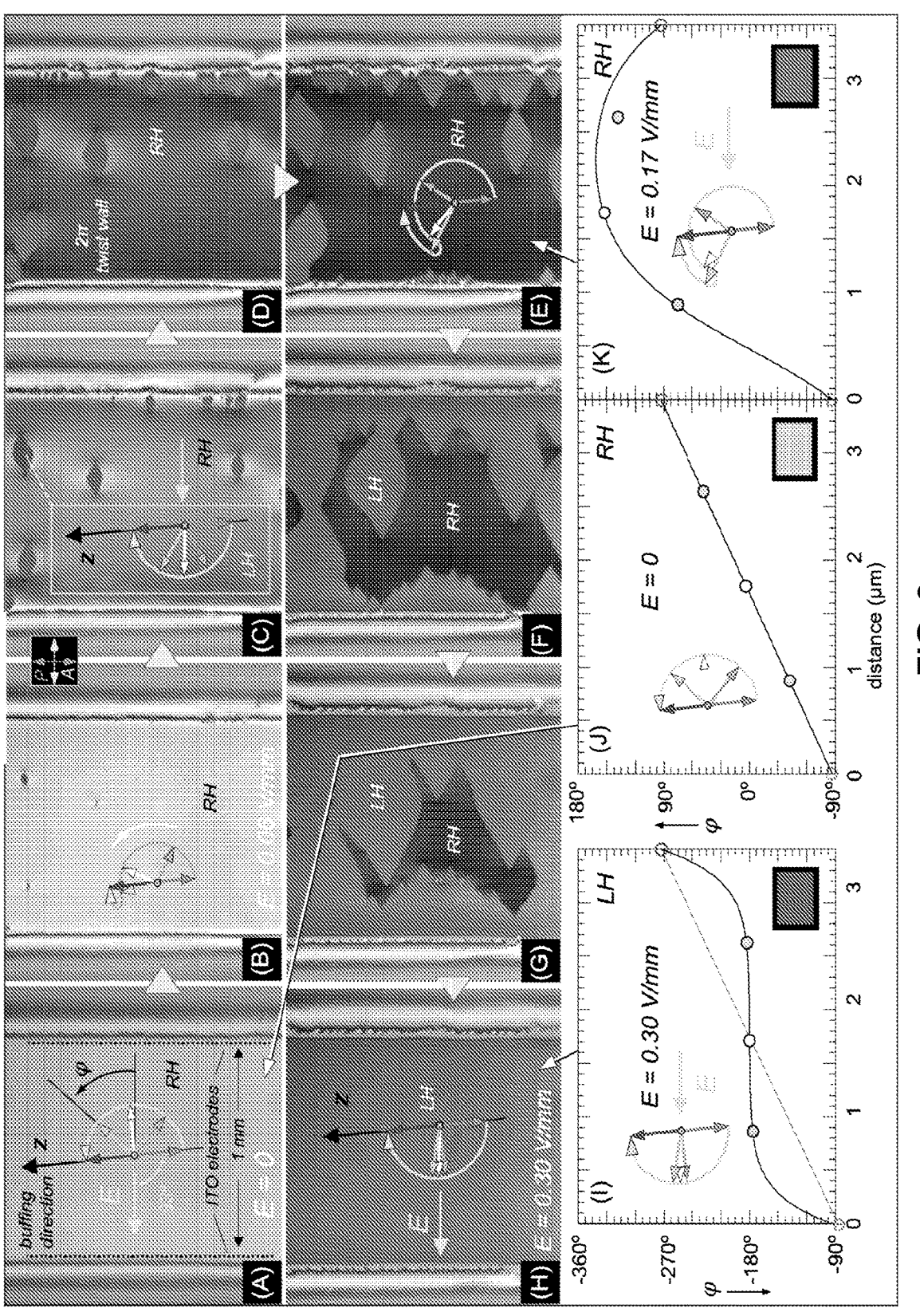

FIG. 3 illustrates low-field polarization reversal in an ANTIPOLAR cell. (A-H) A right-handed (RH) πT state in a d=3.5 μm thick cell of RM734 at T=110° C. This cell has ITO electrodes with a 1 mm gap, producing an electric field E normal to the electrode edges. At the gap center, E=(0.66 v)V/mm, where v is the voltage applied to the electrode gap. The buffing directions are along the z axis, which is oriented 3° away from parallel to the electrode edges and therefore 93° from E. This 3° offset breaks the mirror symmetry about E, causing the n-P couple to preferentially rotate counterclockwise in response to PxE torques (B, white arrow). Increasing applied voltage in the range 0V<v<0.3V gives the progression of images from (A) to (H). The red-to-blue arrow rainbow represents the ferroelectric polarization orientation at a sequence of increasing x-levels in the cell (x=0, d/4, d/2, 3d/4, d). The pink arrows indicate the azimuthal angular trajectory from the bottom to the top of the cell, which is also the light propagation direction. (I-K) Plots of the director profiles φ(x) of LH and RH states as calculated from a static simulation of the field/elastic torque balance equation given in the text. The profiles all have fixed surface orientations at φ(0)=−87° and φ(3.5 μm)=93°. Note that the LH profile is plotted with φ increasing downward. The RH πT state is indicated as in FIGS. 1,2 and is plotted in (J) and (K). Since P in the RH state has a component directed opposite E, it is strongly deformed by the field pushing P around counterclockwise from the right to the left side of the circle. (B,C) At V~40 mV (E~26 mV/mm in the gap center), the LH πT state appears in several places via heterogeneous nucleation, being the field preferred state since it has P largely directed along E. (E,I) The field tends to expel the LH twist to the surfaces, filling the cell center with the preferred orientation. (D) The LT an RN πT states are separated by 2π twist walls. (E-H) The LH and RH states change little in internal structure over this range, as the domain walls move with only a small increase in field. (I-K) Insets show the hue of white light transmission between crossed polarizer and analyzer.

Figure 4:
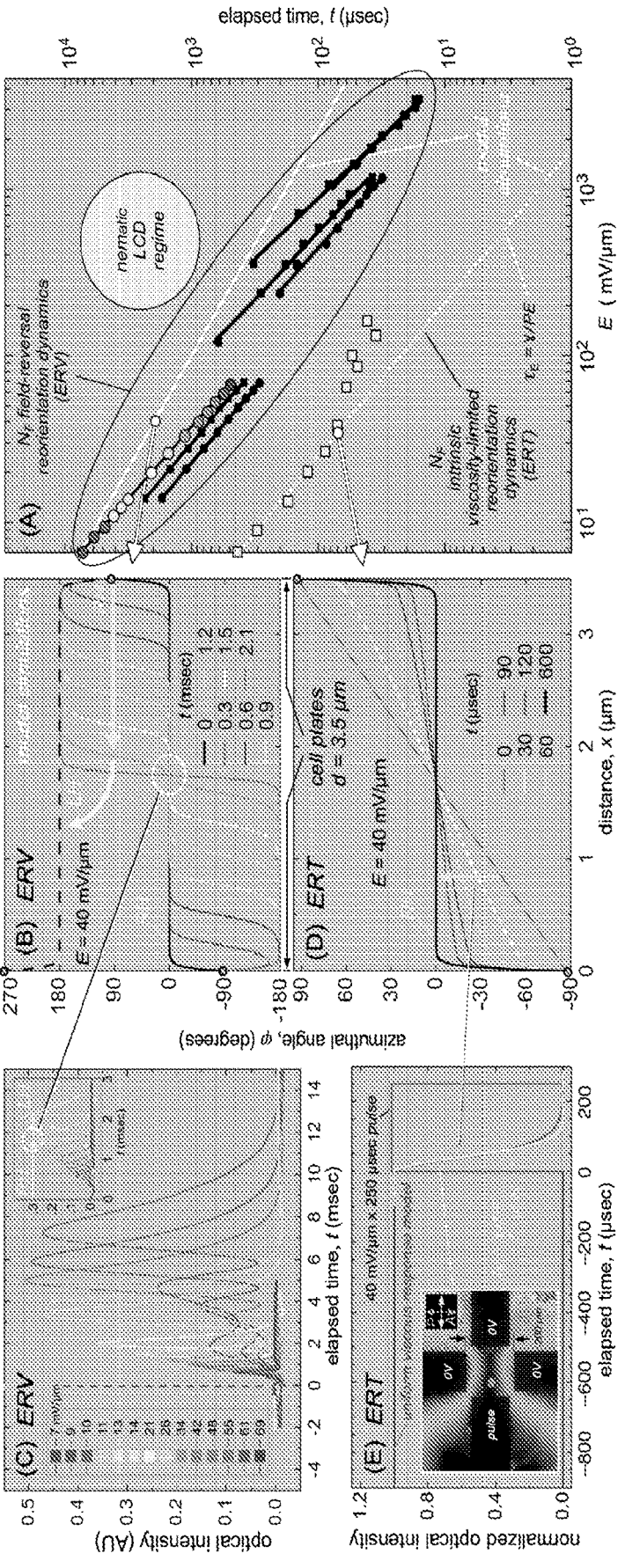

FIG. 4 illustrates NF electro-optics and dynamics of RM734 at T=110° C. (A) Summary of field-induced polarization reversal (ERV) and viscosity-limited (ERT) reorientation data and modeling. ERV regime: black points are field reversal data; colored filled circles are from (C); white circle and solid white line are from (B). ERT regime: cyan filled squares are from (E); white circle and dotted white line are from (D). ERV times are longer because field reversal generates some degree of solitonic response as in (B), in which parts of the cell wait for a soliton to pass in order to reorient. (B) ERV solution of the torque balance equation showing the response to an electric field reversal of a square wave, before which P was in an RH $\pi$T state, and after which P is in a state of low-torque, unstable equilibrium until solitons, starting at the surfaces, pass. The final state (red line) has a 2$\pi$ twist wall at the cell center, which disappears by order reconstruction (cyan arrow), leaving the LH $\pi$T state (dashed). Arrival of the solitons at the cell center produce director reorientation (white circle) that gives the optical transmission peaks in (C) (white circle). (C) Optical transmission peaks between crossed polarizer and analyzer following a field reversal. Arrival times of the solitons at the cell center are plotted in (A), color coded as in (C). The same set of peaks appear upon the − to + as the − to + transitions, showing that each transition completely switches the handedness of the $\pi$T state. (D) Simulated ERT response of a uniformly twisted RH $\pi$T state to an E field favoring its mid-cell orientation at $\varphi$=0. The final E-induced state (black) shows that at this field, the field penetration length of surface orientation into the cell, $\xi E = \sqrt{K/PE}$, is small. In this case, each element dx=$\xi$E of the director profile $\varphi$(x) responds independently to the field as $\varphi$E(t) (see text), and can be used to analyze the uniform $\varphi$(t) data in (E). (E) Four gold-electrode cell (NSEW) with random planar alignment, and a pulsed voltage applied to W, with NS & E grounded. A small DC bias sets the starting orientation $\varphi$o to ~45° and the transmission I(t) between crossed P and A is measured. 10% to 90% response times are shown vs. field amplitude as the cyan squares in (A). In the smaller applied fields the response times decrease as 1/E and are used to determine $\gamma$. The deviation from the 1/E dependence at large E is due an effect of depolarization voltage at the electrodes, appearing at short times.

Figure 5:
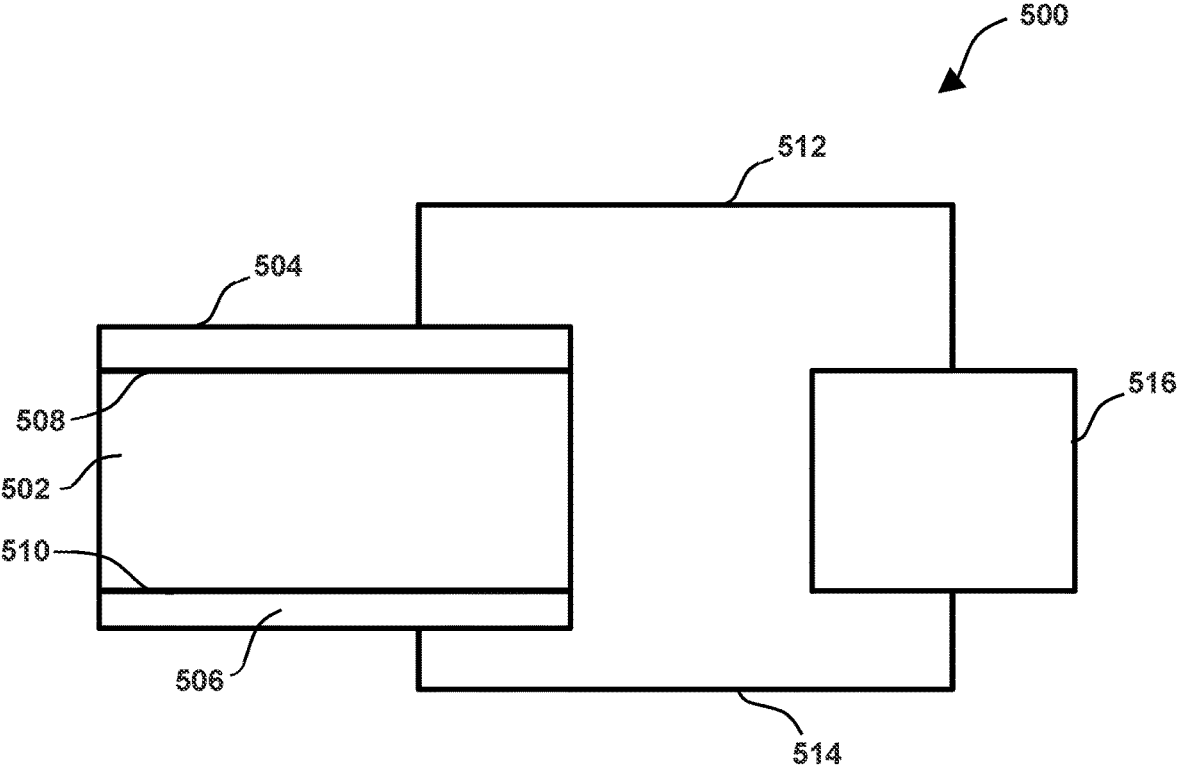

FIG. 5 illustrates a device in accordance with examples of the disclosure.

It will be appreciated that elements in the figures are illustrated for simplicity and clarity and have not necessarily been drawn to scale. For example, the dimensions of some of the elements in the figures may be exaggerated relative to other elements to help understanding of illustrated embodiments of the present disclosure.

DETAILED DESCRIPTION OF EXEMPLARY EMBODIMENTS OF THE DISCLOSURE

Although certain embodiments and examples are disclosed below, it will be understood by those in the art that the disclosure extends beyond the specifically disclosed embodiments and/or uses of the disclosure and obvious modifications and equivalents thereof. Thus, it is intended that the scope of the disclosure should not be limited by the particular embodiments described herein. The illustrations presented herein are not meant to be actual views of any particular material, apparatus, structure, or device, but are merely representations that are used to describe embodiments of the disclosure.

Exemplary embodiments of the disclosure provide improved devices. Exemplary devices include a volume comprising ferroelectric nematic liquid crystal-forming molecules and one or more materials comprising one or more surfaces in contact with the volume.

In accordance with examples of the disclosure, the volume contains a ferroelectric nematic liquid crystal phase, said ferroelectric nematic liquid crystal phase comprising a vectoral orientation field of the electric polarization density throughout the volume, wherein said one or more surfaces are configured to impart a favored surface polarity of the molecules, said favored surface polarity controlling said vectoral orientation at the interfaces with the one or more surfaces. The one or more materials can comprise a first material comprising a first surface in contact with the volume and a second material comprising a second surface in contact with the volume. The second surface can be configured to impart a favored surface polarity of the molecules to control a vectorial orientation of the molecules within the volume at an interface with the second surface. The favored surface polarity of the molecules can include a component locally normal to and directed away from at least one of the one or more surfaces. The favored surface polarity of the molecules can include a component locally normal to and directed toward at least one of the one or more surfaces. The favored surface polarity of the molecules can include a component locally tangent to at least one of the one or more surfaces, said component can include a unique favored azimuthal orientation about a surface normal to at least one of the one or more surfaces. In accordance with examples of the disclosure, the favored surface polarity of the molecules comprises a component created by unidirectional buffing of a surface of the one or more surfaces. In accordance with additional examples, the favored surface polarity of the molecules is created using an oblique illumination of a surface of the one or more surfaces by an electromagnetic wave (e.g., having a wavelength in the range of about 0.1 $\mu$m to about 10 $\mu$m). In accordance with additional examples, a surface polarity of the molecules can include a component created via photo-polymerization induced by illumination of a surface of the one or more surfaces. In accordance with further examples, the favored surface polarity of the molecules comprises a component created via photo-polymerization induced by illumination of a surface of the one or more surfaces, where said illumination is oblique. In some cases, the favored surface polarity of the molecules comprises a component created via photo-degradation induced by illumination of a surface of the one or more surfaces. In accordance with examples of the disclosure, the favored surface polarity of the molecules comprises a component created via photo-polymerization induced by illumination of a surface of the one or more surfaces. In accordance with further examples, the favored surface polarity of the molecules comprises a component created by deposition of material onto a surface of the one or more surfaces. The deposition can be oblique. In accordance with further examples, the favored surface polarity of the molecules comprises a component created by etching of material from the one or more materials. The etching can be oblique. In accordance with further examples of the disclosure, the device includes one or more electrical connections to apply an electric field to the volume and/or an apparatus to apply an electromagnetic field electric field to the volume.

In accordance with further examples of the disclosure, a method for controlling a favored vectoral orientation in three dimensions of a polarization field of a ferroelectric liquid crystal at an interfacial surface with a material or materials is provided. An exemplary method includes providing a volume comprising ferroelectric liquid crystal-forming molecules, providing a first material having a first surface in contact with the volume, and using the first surface, imparting a favored surface polarity of the molecules, said favored surface polarity controlling said favored vectoral orientation of the molecules in said volume. The method can further include providing a second material having a second surface in contact with the volume. The favored surface polarity of the molecules can include a component locally normal to the surface and directed toward the surface. In some cases, the favored surface polarity of the molecules comprises a component locally normal to the surface and directed away from the surface. The favored surface polarity of the molecules can include a component locally tangent to the first surface. Said component can include a unique favored azimuthal orientation about the surface normal. In some cases, the favored surface polarity of the molecules comprises a component created by unidirectional buffing of the first surface. The favored surface polarity of the molecules can include a component created using an oblique illumination of the first surface by an electromagnetic wave (e.g., having a wavelength in the range of about 0.10 μm to about 10 μm). In some cases, the favored surface polarity of the molecules includes a component created via photo-polymerization induced by oblique illumination of the first surface. In some cases, the favored surface polarity of the molecules comprises a component created via photo-degradation induced by oblique illumination of the first surface. The favored surface polarity of the molecules can include a component created by oblique deposition and/or etching of material onto or from the first surface. In accordance with various examples of the disclosure, the contact of the first surface to the volume is made at a first temperature phase and the volume is cooled into the ferroelectric nematic phase at a second temperature. The volume can include a nematic phase at the first temperature. In some cases, the volume comprises an isotropic material at the first temperature. The volume can include a ferroelectric nematic phase. In accordance with further examples of the disclosure, an interfacial control is employed to establish the polar vectorial orientation in three dimensions of a spontaneous polarization field in the volume of a ferroelectric nematic liquid crystal.

In accordance with further examples of the disclosure, a method of forming a ferroelectric nematic liquid crystal device is provided. The method includes providing a volume comprising ferroelectric liquid crystal-forming molecules in a nematic state, providing a first material comprising a first surface in contact with the volume, and imparting a favored surface polarity of the molecules, said favored surface polarity controlling a vectoral orientation at an interfaces with the first surface. Interfacial control establishing the polar vectorial orientation in three dimensions of a spontaneous polarization field in the volume of a ferroelectric nematic liquid crystal can be achieved upon cooling the volume of liquid crystal from a higher temperature phase to a ferroelectric nematic liquid crystal phase, where the higher temperature phase is a nonferroelectric nematic phase and wherein said cooling is configured to maintain a temperature gradient within the liquid crystal during cooling into the ferroelectric nematic phase. The cooling can be configured to maintain a temperature gradient within the liquid crystal during cooling into the ferroelectric nematic phase, said gradient enabling the ferroelectric nematic phase to form first on selected surfaces. The method can additionally include a step of applying an electric field to said ferroelectric nematic phase. Additionally or alternatively, the method can include providing dopant molecules dissolved in the ferroelectric nematic phase. The dopant molecules have dipole moments, said dipole moments being preferentially aligned by the vectorial orientation field of the FNLC adjacent to or in their vicinity. In accordance with further examples, said ferroelectric nematic phase is a mixture of two or more distinct molecular species. In some cases, the ferroelectric nematic phase is a eutectic mixture. In accordance with any of the examples above, the volume vectorial orientation of said FNLC forms an orientational glass (e.g., develops a high viscosity, more than $10^8$ of the viscosity of the material in the isotropic phase) as the temperature is lowered.

In accordance with yet additional examples of the disclosure, another device is provided. The device includes a volume comprising ferroelectric liquid crystal-forming molecules and a first material comprising a first surface in contact with the volume, wherein the first surface is configured to impart a favored surface polarity of the molecules to control a vectoral orientation of the molecules within the volume at an interface with the first surface. The volume includes a ferroelectric nematic phase. The device can include any of the features noted above in connection with other devices and/or methods to form the devices.

We show that the polar ordering of the NF in devices described herein results in transformative changes in the interaction of nematics with bounding surfaces, a key aspect of nematic LC science and its potential for technology. We demonstrate that structuring of the vectorial orientation distribution of a 3D volume of polar molecules can be achieved by controlling the polarity of its 2D bounding surfaces. In the simplest example, if the orientation of the preferred polarization is vectorially unidirectional over most of the surfaces, then the NF volume polarization can be similarly oriented, that is poled into vectorial uniform orientation by the surfaces, without the need for an applied field.

Samples of materials with spontaneous vectorial order such as ferromagnets and ferroelectrics minimize their internal energy by dividing into domains of different orientation of their magnetization, M(r), or polarization, P(r), respectively, and having these fields locally parallel to their surfaces, in a way that minimizes the energy of the internal and external magnetic or electric fields they produce. Intentionally disrupting this picture by applying an external field (field poling) is an important process in their use, e.g., putting an iron rod in a magnetic field to produce a bar magnet, or the external reversal of the polarization of a ferroelectric nanocrystal that serves as bit storage in non-volatile solid state memories. Field poling of soft materials, such as the corona poling of chromophore containing polymers to generate poled monodomains for nonlinear optical and electronic electro-optical applications have been less successful because of the high fields required. In contrast, we find that surface poling of ferroelectric nematics can achieve monodomain ordering of their nearly-perfect polar order in the absence of poling field.

In the ferroelectric nematic, a reduction in symmetry associated with the appearance of the bulk polarization density P(r), yields a macroscopic coupling of P to applied field E through the bulk energy density $U_{PE} = -P \cdot E$. In molecules where the net molecular dipole is nearly parallel to the steric long axis of the molecule, P(r) is macroscopically coupled to be parallel to $\pm n(r)$ by an orientational energetic preference $U_{Pn} = -u_{Pn}(n \cdot P)/|P|$. The energy density coefficient $u_{Pn}$ can be estimated as $u_{Pn} \sim k_B T/vol$ where vol is a molecular volume. If we apply a step change in the orientation of P(r) at x=0 then n(r) will follow within a distance $|x| = \xi \sim \sqrt{(K/u_{Pn})}$, which will also be of molecular dimensions. P(r) and $\pm n(r)$ are therefore essentially locked together in orientation on the macroscopic scale, so if a field is applied, the response is generally to reorient n(r) by reorienting P(r). An exception to this is the movement of polarization reversal walls, which flip P by 180° in a uniform n field.

The description of exemplary embodiments provided herein is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features.

In this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings.

Surfaces can include any suitable, surface including those described herein. Surfaces can include interfacial surfaces.

EXAMPLES

The examples described below illustrate various devices and methods of forming and using the devices. The examples are illustrative and are not meant to limit the scope of the invention.

Polar Surface Anchoring—Intersection of P(r) with a bounding surface deposits polarization charge/area on the surface, producing electric field-induced, long-ranged interactions with external ionic and electronic charge, and with the $N_F$ director. However, since bounding surfaces are themselves always inherently polar, localized surface interactions, characterized by $W(\theta,\varphi)$, the energy/area of LC-surface interaction vs. the $(\theta,\varphi)$ the orientation of the director $n(r)$ at the surface about its normal, must include polar contributions, in addition to the nonpolar RP terms. A vector field $S(r_s)$, defined on the surface manifold, $r_s$, and everywhere normal to a locally planar interface can be taken to represent an inescapable element of polarity associated with the surface. $S(r_s)$ will, in general, give the location and value of maxima in structural gradients, for example in interfacial electric polarization density, in the density of some molecular component of the LC or of the bounding phase, or in the polarization density of molecular components of the interface material.

The appearance of polarization in the $N_F$ phase adds a term $W_P(r_s) \propto P(r_s) \cdot S(r_s)$ to W, which will favor a preferred sign for the component of P along the surface normal direction, taken to be x. Additionally, if the surface structure has in-plane anisotropy, for example as a result of abrasive bidirectional buffing, the nematic director orientation at the surface will be subject to an RP-type interaction, which by itself will give preferential in-plane (y,z) alignment of n(r), stabilized by a surface energy density $W_Q(\varphi)$, where $\varphi$ gives the in-plane azimuthal orientation between n and the buffing direction, z. $W_Q(\varphi)$ must be anisotropic but nonpolar and therefore reflection symmetric about the buffing and its in-plane normal $[W_Q(\varphi)=W_Q(-\varphi)=W_Q(\pi-\varphi)=W_Q(\pi+\varphi)]$. Following RP, we take $W_Q(\varphi)$ to be quadrupolar, with $W_Q(\varphi)=\omega_Q \sin(2\varphi)$, where $\omega_Q$ is a phenomenological coefficient. For bidirectional buffing or normal incidence photoalignment in the (x,z) plane, the preferred director orientation also has n parallel to the surface (PLANAR case, described by the white double headed arrows in FIG. 1A). The inherent surface polarity (grey arrows in FIG. 1A) is normal to this preferred orientation, and thus does not induce in-plane polar symmetry-breaking along n.

If, on the other hand, in-plane anisotropy is produced by unidirectional buffing along z or by oblique photoalignment or some other oblique treatment in the (x,z) plane, then the surface orientation of n preferred by this treatment will not be parallel to the surface, but make some angle $0<\psi<\pi/2$ with the surface plane (PRETILTED case). In such a pretilted geometry, $W_P$ is nonzero as there will then be in equilibrium a component of P along S, coupling the inherent polarity of the surface normal (grey arrow in FIG. 1B) to both the in-plane and normal components of P. That is, while the pretilted quadrupolar interaction will provide equivalent surface energies for n and −n, with pretilt the surface energies for P and −P will be different. Grey/white arrows are used in FIG. 1B to represent this polar feature in the surface interactions. If $\varphi$ is the in-plane azimuthal angle between c, the in-plane component of n, and the rubbing direction z, then $W_s(\varphi)$ must be reflection symmetric about the rubbing direction $[W_s(\varphi)=W_s(-\varphi)]$, and may be taken to have the form $W_s(\varphi)=W_Q(\varphi)+W_P(\varphi)=\omega_Q \sin(2\varphi)+\omega_P \sin(\psi) \cos(\varphi)$, where $\omega_P$ is a phenomenological coefficient. The quadrupolar anisotropy of the LC surface energy density $\omega_Q$ has been widely studied experimentally. In contrast, $\omega_P$ is required by symmetry but neither its magnitude nor its sign is known. Here we demonstrate and use the in-plane polar surface alignment of the $N_F$ phase, to obtain an estimate the polar component of the anchoring energy, and show that such interactions enable full polar control of the geometry of the nematic director in planar-aligned cells. We create twisted states of the nematic director and apply in-plane electric fields to produce voltage controlled optical activity, using much smaller field and achieving a faster response.

RM734 (R. J. Mandle, S. J. Cowling, J. W. Goodby, A nematic to nematic transformation exhibited by a rod-like liquid crystal. Phys. Chem. Chem. Phys. 19, 11429-11435 (2017). DOI: 10.1039/c7cp00456g) {isotropic (I)→182° C.→nematic (N)→133° C.→ferroelectric nematic $(N_F)$} was filled into glass cells with a gap of thickness d separating plates, one of which was patterned with ITO or gold electrodes spaced by L for application of in-plane electric fields. Cells were studied optically using depolarized transmitted light microscopic imaging (DTLM) with incident white light and using single-wavelength transmission measurements with 632 nm HeNe laser light, focused to a 30 μm diameter spot. Both random planar glass surfaces giving a Schlieren texture in the N phase, and plates coated with buffed polymer alignment layers giving N phase planar monodomains upon cooling from the isotropic phase, were used.

The polymer aligned cells included ones with d=11 μm and weak bidirectionally buffed alignment layers 102, 104 about volume 106, providing a preferred alignment of n parallel to the buffing direction and to the surface. With this alignment the director (yellow in FIG. 1A) aligns normal to the inherent surface polarity which then does not break polar symmetry along n (white lines in FIG. 1A). These are NONPOLAR in-plane surfaces, making a NONPOLAR cell.

We also used d=3.5 μm and 4.6 μm thick cells with buffed polyimide alignment layers 108, 110 and volume 112 providing a preferred alignment of n at the surface parallel to the buffing direction and tilted from the surface plane by a small pretilt angle, $\psi{\sim}3°$ (FIG. 1B). In this case, according to the discussion above, the inherent surface polarity (grey arrow in FIG. 1B) now has a component along the preferred director orientation. This breaks polar symmetry along n (grey/white arrows in FIG. 1B), such that the surface will exhibit a preferential in-plane orientation of P at the surface, which we refer to simply as being POLAR. If the buffing is unidirectional and parallel on the two flat surfaces of a cell, then the surfaces will be termed SYNPOLAR, and if the unidirectional buffing is antiparallel they will be termed ANTIPOLAR.

Upon cooling a NONPOLAR aligned cell having spatially uniform temperature through the $N$–$N_F$ transition at $-1°$ C./min, it becomes patterned with a texture of irregular domains extended locally parallel to n(r), first appearing on a submicron scale but then annealing over a roughly $2°$ C. interval into a pattern of lines, of low optical contrast and up to millimeters in length, that are also oriented generally along n(r). These lines coarsen or evolve to form closed loops in some places 10-200 microns in extent, having a distinctive and characteristic lens shape, elongated along n(r), as in FIGS. 1A,C. These lines form boundaries of pure polarization reversal (PPR) between ferroelectric domains of P with opposite sign of P, which occupy roughly equal areas of the cell, i.e., show little preference for a particular sign of P. Application of a small probe field enables visualization of the distinct orientations of P, providing prime evidence for the ferroelectric nematic phase in RM734. NONPOLAR alignment thus produces quality uniform alignment of n which gives good extinction between crossed polarizer and analyzer, and which is populated by hectomicron to millimeter-scale domains of opposite sign of P.

In SYNPOLAR aligned cells with spatially uniform temperature cooled at $-1°$ C./min through the $N$–$N_F$ transition the uniform N phase nematic monodomain grows into a polar monodomain of the $N_F$ phase. This texture is defected by the appearance of the crystal phase at $T{\sim}90°$ C., but quenching from $T{=}120°$ C. to room temperature results in a glassy, uniformly birefringent monodomain.

We also probed the in-plane polar ordering and alignment effects of single surfaces in cells with the aid of the temperature gradient methods of Aryasova and Reznick. They studied nematic LC structure and phase behavior with the LC between glass plates, while maintaining a constant temperature difference, $\Delta T$, across the thickness of the cell. Upon cooling through the isotropic (I)-to-nematic (N) phase transition under these conditions, they found that the dominant nematic alignment obtained was that of the cooler cell surface. Thus, with the temperature gradient applied, the I/N interface appears first at the cooler surface and moves as a quasi-planar sheet from that surface to the other. In a cell with one plate coated with a rubbed polymer film, and the other an untreated polymer film giving random planar alignment, this form of cooling was found to produce a uniform, planar-aligned cell upon growing the nematic from the rubbed surface, or, in the same cell, a defected Schlieren texture upon growing the nematic from the other, random planar aligning, surface.

RM734 was cooled at $-1°$ C./min through the $N$–$N_F$ transition in ANTIPOLAR cells while maintaining a ${\sim}2°$ C. temperature difference between the outside of the top and bottom cell plates, with the top plate cooler. The temperature difference across the LC-containing cell gap can be estimated to be $\Delta T{\sim}0.1°$ C. In these cells, the N to $N_F$ transition appears as a sharp boundary across which there is a discernably larger birefringence in the $N_F$ phase. As this boundary moves across the cell and toward the lower plate it leaves behind a polar $N_F$ monodomain, as illustrated in FIGS. 1B,C. This cooling process is sketched in FIG. 1B, showing that the $N_F$ phase nucleates and appears in the nematic from the cooler surface, and, as evidenced by the uniformly orange birefringence color left behind, grows to fill the whole gap between the plates and achieve a uniformly birefringent oriented structure. This state extinguishes between crossed polarizer and analyzer and has a birefringence color indicative of planar or nearly planar alignment, i.e., n and P are uniform through the cell and parallel to the plates. An important feature of such planar-aligned $N_F$ cells with large P is their block polarization structure, wherein splay of the P-n couple and termination of $P_x$ at interfaces is suppressed by the high electrostatic energy cost of polarization charge. Any surface-imposed pretilt therefore disappears within a polarization self-field penetration length $\xi_P{=}\sqrt{K\varepsilon_o}/P^2{\sim}0.1$ nm for $P{=}6$ $\mu$C/cm$^2$ of the surface, with the $P(r)$-$n(r)$ couple becoming locally parallel to the cell plates, the orientation where $E_x{=}0$. If P rotates to develop an x component, then the $E_x$ resulting from polarization charge at the surfaces will act to return P to parallel to the plates. The in-plane orientation of P can be probed by application of a few V/cm in-plane electric field. The uniform orientation of n-P in this as-grown monodomain indicated that while the cooler surface nucleates and grows its preferred POLAR orientation of P, the warmer surface is forced to adopt the non-preferred POLAR orientation. In SYNPOLAR cells, both surfaces end up in their preferred states.

If the cooling is halted ${\sim}7°$ C. or less below the $N$–$N_F$ transition, this situation persists, with the polar monodomain spreading to fill the cell area. However, if the ANTIPOLAR cell is cooled further to $T{\sim}120°$ C. a structural transition occurs, with multiple domain boundaries nucleating and moving across the cell, leaving the regions that are purple-colored in FIG. 1D. This purple region has its own set of internal domain walls (FIG. 1D). Notably, as shown in FIGS. 2A,B, optical extinction between crossed polarizers with n along the optical polarization is no longer obtained in this new domain, indicating a nonuniform director field which, in the absence of applied electric field, can only a twisted state, with n parallel to the plates and reorienting helically at a constant $\partial\varphi/\partial x$. Within this twisted domain internal domain walls which exhibit identical brightness and color between crossed polarizer and analyzer (FIG. 1D), and which become either darker or brighter if the polarizer and analyzer are uncrossed, depending on the sign of the uncrossing angle (FIGS. 2E,F). This is an optical signature of pairs of identical twisted states of opposite handedness [left handed (LH) or right handed (RH)]. At given place in the cell, the passing of the orange-to-purple boundary mediates a spontaneous transition to macroscopic chirality. In FIG. 2, a device 200 includes a 206, a first material having a first surface 202, and a second material having a second surface 204.

Since the uniform azimuthal orientation field of n(x) that grows in at the $N$–$N_F$ transition has its preferred orientation on the cooler plate, (at x=d) and a less energetically favorable condition on the warmer surface (at x=0), we propose that the lower T transition to a twisted state is a flipping of n-P at the warmer surface to its energetically favored orientation, at the cost of twist elastic energy density of the bulk director field, $U_T{=}\frac{1}{2}K(\partial\varphi(x)/\partial x)^2$. A convenient parameterization of the anchoring strength of such anisotropic surface interactions is given by the "surface penetration length" $l{=}K/\omega$, where K is the twist elastic constant and w the relevant energy density coefficient. Applying a torque to the LC director induces a linear $\varphi(x)$, which extrapolates to zero a distance 1 into the surface. Taking K=5 pN and $\omega_Q \sim 10^{-4}$ J/m² for typical rubbed polyimide alignment we have $l_Q \sim 50$ nm, so that deformations in the few micron thick LC films used here occur with n(r) at the surface essentially fixed along one of the quadrupolar preferred orientations. Since the fraction of a $\pi$ twist in the LC is $d/(d+2l_Q) \cong 1$, the torque transmitted by the bulk Frank elasticity and applied to the surfaces does not push the orientation at each surface very far from that of the quadrupolar surface-rubbing-preferred energy minima, $\varphi \cong 0$ or $\pi$. With the present ANTIPOLAR surfaces these minima in $W_Q$ on the warmer surface will be at $\varphi=0$ and $\varphi=\pi$, with the minimum at $\varphi=0$ being of higher energy, and the one at $\varphi=\pi$ of lower energy only because of $W_P$. The minimum at $\varphi=0$ is therefore metastable, and, as $\omega_P$ increases in magnitude as T is lowered due to the increasing magnitude of P, a transition from $\varphi=0$ to $\varphi=\pi$ becomes possible at the warmer surface. For a linear $\pi$ twist, $\varphi(z)=\pi x/d$, the condition from $U_T$ for this transition to occur is $\omega_P > K\pi^2/4d \sim 5 \times 10^{-6}$ J/m². This minimum requirement is considerably smaller than $\omega_Q$. The nature of surface normal polar ordering of LC varies widely, ranging from the perfect polar order ordering of 5CB on semiconductor surfaces to none for mirror symmetric molecules. Ferroelectric chiral smectics exhibit polar surface interactions including preferred normal polarization reversal at the surface, and the induction of polarization at the surface. In the latter experiment, a chiral smectic A exhibiting an electroclinic effect, has its normal component of polarization at the surface experiencing an effective surface field $E_s \sim 2V/\mu m$, normal to the surface. If the polar force is electrostatic, then the corresponding energy/area, $U_P$, depends on 1, the thickness of the interaction volume, with $U_P \sim PE_s l$. For the $N_F$ phase, assuming an interaction volume of molecular dimension, a similar estimate would give $U_P \sim 10^{-4}$ J/m² and $\omega_P = U_P \sin \psi \sim 10^{-5}$ J/m². Surface polarity can also induce LC polarization and, thereby, flexoelectric and order electric gradients in the vicinity of the surface.

Considering in more detail the events at the warmer surface as the $N-N_F$ growth front approaches, as in FIG. 1B, the $N_F$ phase is replacing the N phase which contacts the warmer buffed surface with its director lying in one of the quadrupolar director orientational surface energy minima. The $N_F$ director has the same orientation, but the polar orientation induced in the N phase by the surface does not match that of the approaching $N_F$ front: a PPR wall is being created in a uniform director field. This geometry is at least metastable at temperatures near the $N-N_F$ transition. At lower temperatures, the orientation of n near the surface changes by $\pi$, transitioning to the other quadrupolar minimum, but leaving P at the surface fixed. If the temperature gradient along x is reduced, then the $N_F$ will grow in from both surfaces and the PPR wall will form in the bulk. This case is sketched in FIG. 2C, which also shows the simple topological transition that can take place whereby appropriate twist deformation of P-n at the PPR wall reduces the magnitude of the component of P being reversed, leading to the disappearance of the PPR wall and the appearance of a twist wall which spreads to fill the cell, giving a $\pi$T state. This is a barrier-limited transition because the initial twist must be substantial over the width of the PPR wall. If a gradient in T is present, the process of eliminating the PPR wall near the warmer surface is essentially the same. Such a barrier limited topological transition results in the heterogeneous nucleation and growth evident in FIG. 2. The sharp boundary between the uniform and it-twisted states is evidence for the metastability of the $\varphi=0°$ surface-state at the warmer plate. The surface orientation transition between quadrupolar surface energy minima at $\varphi=0$ and $\varphi=-\pi$ is therefore solitonic, very similar in structure to the surface stabilized it reorientation walls in chiral smectic ferroelectric LCs (SSFLCs), and similarly described by a double sine-Gordon equation. The walls that separate the $\pi$T states are topological: $2\pi$ twist walls ($2\pi$TWs). These states are diagrammed in FIGS. 1,2, showing that in this cell geometry, with the rubbing direction nearly parallel to the electrode edges, the polarization at mid-height in the cell, P(x=d/2), is normal to the electrodes, in the y direction for the $\pi$TL state, and in the $-y$ direction for the $\pi$TR, and therefore parallel or antiparallel to the applied field, E. The $2\pi$TWs consist of a $2\pi$ twist disclination line in the bulk n and P fields (FIG. 23). The topological transition giving the field-induced nucleation of the twist wall loops in FIG. 3 is also barrier-limited, resulting in the heterogeneous nucleation of LH domains evident FIG. 3. It should be clear from this discussion that virtually any geometry of twisted planar reorientation of the n-P couple of a ferroelectric nematic can be stabilized between plates by using aligning surfaces of chosen bidirectional rubbing or mono-directional rubbing with appropriate pretilt, combined with chiral doping to control the relative stability of different, otherwise degenerate, twisted states, as employed in twisted nematic devices.

In-Plane Ferroelectro-Optics and Dynamics—Considering the planar oriented cell geometries described above, field-induced orientational dynamic responses can be classified into two principal types, those produced mainly by field rotation (ERT) and those mainly by field reversal (ERV). This division is illustrated in the dynamic simulated 1D field-induced orientation profiles, $\varphi(x,t)$, of FIGS. 4A,B, which show these distinct dynamic limits of the response of an initially LH $\pi$T state to applied in-plane field, $E_y$ switched on at time t=0. FIG. 4D is the ERT case, modeling the effects of the kind of change in $E_y$ that would be generated by a stepwise field rotation. Here $E_y$ favors the orientation $P=P_y$, which is also the starting P at the cell center [$P(x=d/2)=P_y$, as in FIG. 2]. Once this event is finished, the final field-induced configuration (black curve in FIG. 4D) is subjected to a field reversal (ERV). For cells with NONPOLAR surfaces the polar orientations on the surfaces can reverse independently, producing a mix of uniform $\pi$TL and $\pi$TR states, and the resulting surface walls can be moved by applied field. By contrast, in the 3.5 μm thick ANTIPOLAR cell, we do observe field-induced polar surface reorientations, the surfaces stay in their POLAR preferred minima in our E-field experiments, and the simulations presented here in FIGS. 4B,D of an ANTIPOLAR cell, have fixed surface orientations. But, in general, there may also be surface orientation transitions induced by the field-induced torques for finite $W_s(\varphi)$. We consider the ERT, domain wall, and ERV cases in the following three sections. In each case the field variable E is that which is applied at the area of measurement: the probe laser spot in the ERT and ERV cases; and in the electrode gap center for the domain dynamics images. In the gap center E≈0.66 v/(1 mm), where v is the voltage applied to the electrode gap, a reduction due to the spread of field in the x direction from the thin electrode edges.

ERT Dynamics—In the ERT response, $\Delta\varphi$, the field-induced reorientation of P to end up parallel to the applied E is $|\Delta\varphi| \leq 90°$. The field-applied torque, $\mathcal{T}_E = -PE_y \sin \varphi$, tends to rotate P toward $\varphi=0$. Applying $E_y>0$ to the $\pi$T $\varphi(x)$ geometry of FIG. 2D, this condition is obtained everywhere in the cell in a continuous fashion with fixed topology, except for the surface regions at x=0 and x=d where the twist is squeezed into a thickness comparable to the deGennes field penetration length $\xi_E = \sqrt{K/PE} \sim 50$ nm for $P=6$ $\mu C/cm^2$ and an applied field $E_y=40$ V/mm. At fields $E>1$ V/mm, where the twist is confined to sub-wavelength thick surface regions, the optical transmission of this cell will approximate that of a uniform birefringent slab, giving near-extinction with crossed polarizer and analyzer along y and z. In this simulation, $E_y=40$ V/mm and the surface anchoring is assumed to infinitely strong, fixed at $\varphi(x=0)=\pi/2$ and $\varphi(x=d)=-\pi/2$ respectively.

The orientation response to an applied field is governed by the dynamic torque balance equation, $\mathcal{T}_E=\gamma\varphi(x,t)_t=-PE_y$ $\sin \varphi(x,t)+K\varphi(x,t)_{xx}$, which is simulated in FIGS. 4B,D, and where $\gamma$ is the nematic rotational viscosity. If $\xi_E \ll d$, as is generally the case here, then the ferroelectric and viscous torques are dominant and, the ferroelectric/viscous torque balance independently controls the response of each $\xi_E \times \xi_E \times \xi_E$ volume element of the sample. If $\varphi(t)$ is taken to be uniform within the volume, we obtain $-PE_y \sin \varphi(t)=\gamma\varphi(t)_t$, yielding $\varphi_E(t)=2 \tan^{-1}[\tan(\varphi_o(x)/2) \exp(-tPE_y/\gamma)]$, where $\varphi_o(x)$ is the starting angle between P and $E_y$ in the volume in question, and $E_y=V_{IN}/L$, where L is the effective electrode gap. For small $\varphi_E(t)$, this gives exponential dynamics with the characteristic relaxation time $\tau_E=\gamma/PE_y$. With these approximations, $\varphi_E(t)_t \approx \varphi_E(t)/\tau_E$ so that the linearity of $\varphi_E(x)$ should be maintained during reorientation, as is indeed seen in FIG. 4D. The ERT reorientation response time $\tau_E$ is the intrinsic, viscosity-limited response time, the fastest achievable for given y and P, scaling as $1/E$, and plotted from the simulation in FIG. 4D as the lower white line in FIG. 4A. The electro-optic response in the ERT geometry was measured in RM734 by using short $E_y$ pulses on the West electrode in the four-electrode geometry of FIG. 4E to reorient a 5 $\mu$m thick random planar cell at T=110° C. A small DC bias was applied initially to the West electrode to give $\varphi_o \sim 45°$ and maximize the starting transmitted intensity $I_o$ between crossed polarizer and analyzer. Assuming uniform orientation the transmitted intensity is given by $I(\varphi(t))=I_o \sin[2\varphi(t)]^2$. A typical measured response (solid cyan curve) fitted by $\varphi(t)=\varphi_E(t)$ (blue line), yields $\tau_E=\gamma/PE=71$ $\mu$sec for $E_y=40$V/mm field step. The optical response was measured in the range 0.66V/mm $< E_y < 36$ V/mm and fit to $I(\varphi_E(t))$ to obtain $\tau_E$ vs. $E_y$, data plotted as the cyan squares in FIG. 4A. In the lower half of this range we find that $\tau_E \propto 1/E_y$, as expected for $\varphi_E(t)$, but $\tau_E$ decreases much more slowly with $E_y$ for higher fields. Fitting the lower field data using $P=6$ $\mu C/cm^2$ gives $\gamma=0.15$ Pa s, which provided the value of $\tau_E$ used for the simulations, giving the dotted white model line in FIG. 4A.

To understand the high-field behavior we consider that, while the large value of P provides a strong coupling of orientation to applied field, it also produces ubiquitous space charge effects that may significantly slow the dynamics. In all of the in-plane field cells studied here, there is an effective thin, insulating barrier at the interface of the $N_F$ phase with the electrodes, a barrier which either has no polarization or in which the polarization is fixed in orientation. Such layers use part of the applied voltage in maintaining the physical separation of free charge carriers from the polarization charge forced at an insulating interface with the $N_F$. For example the polymer films used for alignment create such a layer, but even the cell in FIG. 4E, where the interface is $N_F$/gold, such an insulating layer exists. If it has a capacitance C Farads/cm$^2$, then $E_y=V_{IN}/L$ in the above equation for $\varphi_\varepsilon(t)$ should be modified as follows $E_y=V_{IN}/L \rightarrow [V_{IN}-(P/C) \cos \varphi_E(t)]/L$, reducing $E_y$ by the depolarization voltage $(P/C) \cos \varphi\varepsilon(t)$. Generally, these capacitors are leaky, with free charge passing through to the polarization charge, a process which can be modeled as a resistance R $\Omega/cm^2$ in parallel with C. We then obtain $E_y=V_{IN}/L \rightarrow (V_{IN}/L)\{1-(P/C) \cos \varphi\varepsilon(t)\cdot\exp[-t/RC]\}$. At low $E_y$, the response is sufficiently slow that the P/C voltage relaxes away, leaving the full $V_{IN}/L$ field on the LC layer, and giving $\tau_E=\gamma/PE_y$ behavior.

Domain-Mediated Dynamics—Generally, for small applied in-plane E the LH and RH $\pi T$ states will have different net energy of interaction with the field. As a result, if both are present in a cell, the $2\pi TW$ boundaries between them will move in the y,z plane to expand the area of those states of lower energy in the field, or new lower-energy ones will be nucleated. Such $2\pi TW$ creation or motion is inherently hysteretic, potentially enabling bistable electro-optic effects. An example of $2\pi TW$ creation is shown in FIG. 3, using an in-plane d=3.5 $\mu$m ANTIPOLAR cell with ITO electrodes spaced by 1 mm. The field is very slowly varying (~0.1 Hz) and weak at E<0.3V/mm, where the significant continuous distortion of a RH $\pi T$ state with an increasing field is punctuated by the nucleation and growth of less distorted LH $\pi T$ domains, which eventually take over the whole cell area (FIG. 3) and will remain if E is returned to zero. The field direction is offset by 3° from the bisector of the antiparallel buffing directions in order to favor the counterclockwise reorientation of P. As a result the $2\pi$ twist walls separating the domains will mutually annihilate on contact and disappear as the LH area grows.

ERV Dynamics—The ERV reorientation is simulated by starting from the field-confined LH state that is the final configuration of the ERT process (solid black curve, FIG. 4D,B), and flipping the sign of $E_y$. Now, the entire cell center has P in a direction opposite to that of $E_y$, an orientation where P experiences zero torque from the field, and thus does not respond. However, near the surfaces, where P is reoriented to the surface preference, there is a torque so the response starts here, developing into solitons that propagate toward the cell center at a velocity $v=\xi_E/\tau_E$, reaching the center in the field reversal time $\tau_R=d/2v \approx \tau_E(d/2\xi_E)$. This leaves a sheet centered at x=d/2 where P makes a $\delta\varphi=2\pi$ reorientation between equivalent orientations of P. This sheet disappears via the topological processes of order reconstruction, or the spontaneous appearance of twist disclination loops, either way changing handedness to leave a field-confined RH $\pi T$ configuration. The simulated time $\tau_R$ is plotted as the upper white line in FIG. 4A, varying with E as $\tau_R \propto E^{-1/2}$, whereas $\tau_E \propto E^{-1}$. In our field range, $\tau_R$ is large compared with $\tau_E$ because of time spent with P at $\varphi=0$ waiting for the soliton to arrive.

ERV dynamics have been probed experimentally in the response of the twisted states of FIG. 2 to square-wave driving, as simulated in FIG. 4B. The optical response enables identification of the soliton propagation (baby pink) and topological transition (baby blue) regimes. FIG. 4C shows the optical transmission through crossed polarizer/analyzer (parallel to E). vs. time following a voltage reversal in a square wave at t=0. This response is identical for +/− and −/+ reversals, indicating that a complete transition between a LH and RH confined T state is obtained at each reversal. Once the solitons have propagated and reorientation is complete, the baseline optical transmission is very low—only the 90° rotated, $\xi_E$ thick surface regions depolarize the light. As E is increased, the overall optical transmission due to the traveling solitons (baby pink regions) gets smaller because the soliton gets thinner. The arrival of the solitons in the cell center is heralded by a distinct optical peak (FIGS. 4B,C, white circles), produced by the transient, extended linear variation in $\varphi(x)$ about $\varphi(x)=0$ (white circles, FIG. 4B,C). This peak is directly followed by the order reconstruction which completes the transition to the confined state of opposite handedness (baby blue regions). The overall transition times $\tau_R$ for this process are plotted vs. E in FIG. 4A (the dot color matches that in FIG. 4C), and are much longer than $\tau_E$. The simulations of FIG. 4B give similar $\tau_R$ values with no adjustable parameters, i.e., just using the $\gamma$/PE values from the ERT data. Also plotted are the optical and polarization field-reversal response times from FIG. 3C of (X. Chen, E. Korblova, D. Dong, X. Wei, R. Shao, L. Radzihovsky, M. Glaser, J. Maclennan, D. Bedrov, D. Walba, N. A. Clark, First-principles experimental demonstration of ferroelectricity in a thermotropic nematic liquid crystal: spontaneous polar domains and striking electro-optics, Proceedings of the National Academy of Sciences of the United States of America 117, 14021-14031 (2020)), obtained for square wave driving but in different cell geometries (black dots). These response times are comparable to those of FIGS. 4B,C, indicative of similar response-delaying effects of field reversal. Interestingly, these individual sets of data all exhibit close to a $\tau_R \propto E^{-1}$ dependence rather than the $\tau_R \propto E^{-1/2}$ expected from the soliton model. This discrepancy may be due to the assumption in the soliton model and simulation that in the beginning, away from the surfaces, there is perfect polar order, with P field stabilized at $\varphi=0$. When the field switches this condition forces each soliton to travel half the cell thickness d/2 in order to switch the cell. In practice, however, due to defects, surface imperfections, and thermal fluctuations, P is only rarely at $\varphi=0$ in the cell interior, and, once the field switches, experiences torques and begins to reorient inhomogeneously. This process will proceed more rapidly as the field is increased, and will lead to the local nucleation and soliton-mediated growth of substantially reoriented domains, depending on the size and orientational deviation of the seeding. To the extent that such domains appear and expand, the net time for complete reversal will decrease because the solitons will have less distance to cover. The $T_R \propto E^{-1}$ behavior would imply a mean soliton travel distance decreasing with increasing E as $E^{-1/2}$. The ERV data in FIG. 4A would suggest that this may be universal behavior.

Nematic and Ferroelectric Nematic Textures—LCs feature a remarkable combination of fluidity and order, which manifests itself in their uniquely facile macroscopic response to surfaces. In thin cells between flat plates, the bulk LC organization is strongly affected by surface interactions, leading to the formation of specific textures, bulk structural themes on the micron-to-millimeter scale that reflect the balance of surface, field, and elastic energies. Analysis of these textures, typically using depolarized transmitted light microscopy, enables the study both of surface alignment characteristics, and of key bulk LC properties like phase behavior, elasticity and symmetry. Friedel's discovery of smectics is the classic example of this. In a cell, if the preferences on the two surfaces are different, then generally each preference should appear somehow in the bulk, either in any given cell, or as a statistical average over the LC organization in many cells. In a hybrid-aligned cell (one side with n normal to the surface and the other side with n parallel to surface), for example, the splay-bend nematic texture that exhibits both preferences. If the two surfaces are equivalent in structure, but different in preferred orientation, e.g., rubbed in perpendicular directions, then the different surface preferences must be expressed equivalently in the bulk LC in some fashion, as they indeed are in the 90° twisted nematic texture that forms. A planar aligned smectic, on the other hand, may accommodate the surfaces in such a 90° cell by forming domains that locally fill the cell, some following the 0° surface and others following the 90° surface, with areas that are equal when averaged over many cells.

This brings us to cells of the $N_F$ phase, in which, new to LC alignment physics, a similar condition appears for the polar ordering at the surfaces. If the two cell surfaces have different preferred polar orientations, then both must be manifested in the cell texture. If the surfaces are structurally identical but different in polar orientation, then the competing polar orientations must be equivalently expressed. The first definitive examples of such behavior in nematics are the $\pi$T states in cells having opposite unidirectional buffing on the two surfaces, shown in FIGS. 1,2. These states have distributions in azimuthal orientation that are symmetric about $\varphi=\pi/2$, thus equivalently containing the competing polar surface orientations. This scenario is achieved by growth in a temperature gradient of the $N_F$ from one surface leaving a PPR wall at the other surface, which becomes unstable at lower temperature, leading to the formation of the twisted state. Cooling without a gradient leads to PPR formation in the cell interior, as in FIG. 2C, giving a uniform director field with a PPR wall parallel to the cell plates that effects a transition between the two surface preferences. The transition to the twisted state in FIG. 2C is barrier limited so the PPR wall may be stable or metastable, depending on its energy cost relative to that of the twist. When cooling without a gradient, N/$N_F$ interfaces move into the cell from both surfaces and may interact with one another. For example, there will be thermal interaction and the potential for a coupled Mullins-Sekerkra instability as the approach of one interface releasing heat will slow the advance of the other.

The Polar Medium—The bulk FN LC (e.g., volume as described herein) can be thought of as a 3D polar medium, filled with the continuous unit vector field v(r)=P(r)/P, the 3D structure of which is determined by its electrostatic and Frank elasticity and by the 2D positional and vectorial nature of interaction with its surfaces. Such a 3D polar medium can, in turn, act as a vectorial solvent, locally orienting polar solute molecules along v(r). If we consider a single RM734 molecule in bulk FN RM734 as an idealized test solute molecule in a ferroelectric nematic solvent, then, for P=6 $\mu$C/cm$^2$, we can estimate from our atomistic simulations an electrostatic energy cost of ~10 $k_B$T for flipping such a solute molecule from its preferred orientation with its molecular dipole parallel to v(r) to the antiparallel orientation. Thus v(r) is effectively a strongly aligning field for molecules with appropriate steric and dipolar structure (e.g. rod-like molecules with longitudinal mean dipole moments), ultimately controlled by the surface.

We have shown that in the ferroelectric nematic, surface polarity takes on an entirely new role in providing coupling to a macroscopic field variable.

MATERIALS AND METHODS

Synthesis of RM734—4-[(4-nitrophenoxy)carbonyl]phenyl 2,4-dimethoxybenzoate (RM734) is a rod-shaped mesogen first synthesized by Mandle et al., cited above. It was reported to have an isotropic (I) phase and two additional phases with nematic character, with transition temperatures as follows: I-187° C.-N-133° C.-Nx-X. Our preparation, described in Reference (M. O'Neill, S. M. Kelly, Photoinduced surface alignment for liquid crystal displays. J. Phys.

D-Appl. Phys.33 R67-R84 (21000). DOI: 10.1088/0022-3727/33/10/201), gives transition temperatures as follows: I-188° C.-N-133° C.-N$_F$-X.

Observations of Response to Applied Electric Field— Experimental cells were made by filling LC samples between glass plates spaced to a desired gap, d. The plates (e.g., 102. 104, 202, 204) were coated with lithographically patterned ITO or gold electrodes for application of an in-plane electric field. The plates can be materials having a surface. Cells with unidirectionally buffed alignment layers were obtained from Instec, Inc. Experiments were performed in temperature controlled environments, with electro-optic observations carried out using depolarized transmission light microscopy with cells mounted on the rotary stage of a research microscope and imaged in transmitted light between polarizers.

FIG. 5 illustrates a device 500 in accordance with various embodiments and examples of the disclosure. Device 500 includes a volume 502, one or more materials 504, 506 comprising one or more surfaces 508, 510 in contact with volume 502. Device 500 also includes one or more electrical connections 512, 514 to apply an electric field to the volume and an apparatus 516 to apply an electromagnetic field electric field to the volume.

The example embodiments of the disclosure described above do not limit the scope of the invention, since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

The invention claimed is:

1. A device comprising:
a volume including a ferroelectric nematic liquid crystal having an electric polarization density field throughout the volume; and
a surface, in contact with the volume at an interface, that imparts a favored surface polarity of molecules of the liquid crystal;
wherein the favored surface polarity controls the vectorial orientation of the electric polarization density field.

2. The device of claim 1, further comprising:
an additional surface, in contact with the volume at an additional interface, that imparts an additional favored surface polarity of the molecules;
wherein the additional favored surface polarity controls an additional vectorial orientation of the electric polarization density field.

3. The device of claim 2, wherein the additional surface is configured to impart an additional favored surface polarity of the molecules to control a vectorial orientation of the electric polarization density field within the volume.

4. The device of claim 1, wherein the favored surface polarity of the molecules comprises a component locally normal to and directed away from the surface.

5. The device of claim 1, wherein the favored surface polarity of the molecules comprises a component locally normal to and directed toward the surface.

6. The device of claim 1, wherein the favored surface polarity of the molecules comprises a component locally tangent to the surface.

7. The device of claim 6, wherein said component comprises a unique favored azimuthal orientation about a surface-normal to the surface.

8. The device of claim 1, wherein the favored surface polarity of the molecules comprises a component created by unidirectional buffing of the surface.

9. The device of claim 1, wherein the molecules are a mixture of two or more distinct molecular species.

10. The device of claim 1, wherein the electric polarization density field at the interface controls the vectorial orientation of the electric polarization density field in the volume.

11. A method for controlling a favored vectoral vectorial orientation in three dimensions of a polarization field of a ferroelectric nematic liquid crystal at an interfacial surface with a material or materials, the method comprising:
providing a first material having a first surface in contact with a volume including the ferroelectric nematic liquid crystal having an electric polarization density field throughout the volume; and
using the first surface, imparting a favored surface polarity of molecules of the ferroelectric nematic liquid crystal, said favored surface polarity controlling said favored vectorial orientation of the electric polarization density field in the volume.

12. The method of claim 11, further providing a second material having a second surface in contact with the volume.

13. The method of claim 11, wherein the favored surface polarity of the molecules comprises a component locally normal to the first surface and directed toward the first surface.

14. The method of claim 11, wherein the favored surface polarity of the molecules comprises a component locally normal to the first surface and directed away from the first surface.

15. The method of claim 11, wherein the favored surface polarity of the molecules comprises a component locally tangent to the first surface.

16. The method of claim 15, wherein said component comprises a unique favored azimuthal orientation about the surface normal.

17. A method of forming a ferroelectric nematic liquid crystal device, the method comprising:
providing a volume including a ferroelectric nematic liquid crystal;
providing a first material comprising a first surface in contact with the volume; and
imparting a favored surface polarity of molecules of the liquid crystal, said favored surface polarity controlling a vectorial orientation at interfaces with the first surface.

18. The method of claim 17, wherein interfacial control establishing a polar vectorial orientation in three dimensions of a spontaneous polarization field in the volume of a ferroelectric nematic liquid crystal is achieved upon cooling the volume of liquid crystal from a higher temperature phase to a ferroelectric nematic liquid crystal phase.

19. The method of claim 18, where the higher temperature phase is a nonferroelectric nematic phase.

20. The method of claim 18, wherein said cooling is configured to maintain a temperature gradient within the liquid crystal during cooling into the ferroelectric nematic phase.

21. The method of claim 18, wherein said cooling is configured to maintain a temperature gradient within the liquid crystal during cooling into the ferroelectric nematic phase, said gradient enabling the ferroelectric nematic phase to form first on selected surfaces.

* * * * *